United States Patent
Shinagawa et al.

(10) Patent No.: US 7,665,447 B2
(45) Date of Patent: Feb. 23, 2010

(54) FUEL VAPOR CONTROL DEVICES

(75) Inventors: Masanobu Shinagawa, Aichi-ken (JP); Hiroshi Takamatsu, Chiryu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 4 days.

(21) Appl. No.: 12/175,003

(22) Filed: Jul. 17, 2008

(65) Prior Publication Data
US 2009/0025694 A1    Jan. 29, 2009

(30) Foreign Application Priority Data
Jul. 27, 2007    (JP) .............................. 2007-195805

(51) Int. Cl.
 *F02M 33/02* (2006.01)
(52) U.S. Cl. ..................... 123/516; 123/518; 123/519
(58) Field of Classification Search ................. 123/516, 123/518, 519, 520
See application file for complete search history.

(56) References Cited

U.S. PATENT DOCUMENTS

| 5,020,687 A | * | 6/1991 | Seizert | 220/645 |
| 5,913,451 A | * | 6/1999 | Madison | 220/723 |
| 5,964,204 A | * | 10/1999 | Freeland | 123/516 |
| 6,360,729 B1 | * | 3/2002 | Ellsworth | 123/518 |
| 6,681,789 B1 | * | 1/2004 | Moulis et al. | 137/14 |

FOREIGN PATENT DOCUMENTS

JP    11 034675    2/1999

* cited by examiner

*Primary Examiner*—Thomas N Moulis
(74) *Attorney, Agent, or Firm*—Dennison, Schultz & MacDonald

(57) ABSTRACT

A fuel vapor control device include a fuel tank for storing fuel, a canister for adsorbing fuel vapor produced in the fuel tank, and an evaporation path communicating between the fuel tank and the canister. The tank has a resiliently deformable wall portion that can resiliently deform in response to an amount of the fuel vapor in the fuel tank, so that volume of the fuel tank can be varied. A pressure regulating valve can perform a relief function for opening the evaporation path during the expansion of volume of the fuel tank to a set volume. The pressure regulating valve closes the evaporation path if pressure inside the fuel tank is lower than the set value. On the other hand, the pressure regulating valve opens the evaporation path if the pressure inside the fuel tank is equal to or higher than the set value.

16 Claims, 1 Drawing Sheet

FUEL VAPOR CONTROL DEVICES

This application claims priority to Japanese patent application serial number 2007-195805, the contents of which are incorporated herein by reference.

BACKGROUND OF THE INVENTION

1. Field of the Invention

The present invention relates, to fuel vapor control devices used mainly for an internal combustion engine installed on a vehicle.

2. Description of the Related Art

A conventional fuel vapor control device is shown in Japanese Laid-Open Patent Publication No. 11-34675. The fuel vapor control device disclosed in the Publication No. 11-34675 includes a fuel tank for storing fuel, a canister for adsorbing fuel vapor produced in the fuel tank, an evaporation path for communicating between the fuel tank and the canister, and a pressure regulating valve for opening and closing the evaporation path. Specifically, the pressure regulating valve closes the evaporation path when pressure inside the tank is less than a set value, and opens the evaporation path when the pressure inside the tank is equal to or higher than the set value. Apart from the fuel tank, a variable volume container (a bladder type subsidiary chamber constituted by bellows) is connected via a communicating path to inside of the fuel tank at above of fuel level. The volume of the variable volume container may change according to increase or decrease of the amount of the fuel vapor produced within the fuel tank. Due to this, the change of the volume of the variable volume container may absorb the fluctuation of the pressure inside the tank according to the increase or decrease of fuel vapor inside the fuel tank. Accordingly, the amount of the fuel vapor to be ejected into the canister can be reduced.

In the conventional fuel vapor control device, separately from the fuel tank, the volume variable container and the communicating path connected to the volume variable container are necessary for inhibiting the amount of the fuel vapor to be ejected to the canister. Due to this, the constitution of the fuel vapor control device has been inevitably complex.

Therefore, there has been a need for a fuel vapor control device that has a simpler constitution.

SUMMARY OF THE INVENTION

One aspect according to the present invention includes fuel vapor control devices that include a fuel tank for storing fuel, a canister for adsorbing fuel vapor produced in the fuel tank, and an evaporation path communicating between the fuel tank and the canister. The tank has a resiliently deformable wall portion that can resiliently deform in response to an amount of the fuel vapor in the fuel tank, so that volume of the fuel tank can be varied. A pressure regulating valve that can perform a relief function for opening the evaporation path during the expansion of volume of the fuel tank to a set volume. The pressure regulating valve closes the evaporation path if pressure inside the fuel tank is lower than the set value. On the other hand, the pressure regulating valve opens the evaporation path if the pressure inside the fuel tank is equal to or higher than the set value. Under this condition, until the volume of the fuel tank is expanded to the set volume, resilient deformation of the resiliently deformable wall portion of the fuel tank absorbs the change of the pressure inside the tank, and accordingly, the amount of the fuel vapor to be fed to the canister may be decreased. In this way, the variable volume container and the communicating path connected to the variable volume container which are required for the conventional fuel vapor control device may be omitted and constitution of the device may be simplified. If the pressure inside the tank is equal to or higher than the set value, the pressure regulating valve opens the evaporation path and the pressure is released via the evaporation path to the canister. When the pressure inside the fuel tank decreases to be lower than the set value, the pressure regulating valve closes the evaporation path.

In one embodiment, the pressure regulating valve opens the evaporation path without performing a relief function when an internal combustion engine is operating. Accordingly, the pressure inside the tank is maintained to be low. Under this condition, if the internal combustion engine is stopped, the pressure regulating valve starts to perform the relief function on the condition that the pressure inside the tank is low. Due to this, the amount of the fuel vapor stored in the fuel tank may be increased compared to the case where pressure regulating valve starts the relief function on the condition that the pressure inside the tank is high. Accordingly, the amount of the fuel vapor to be fed to the canister may be reduced.

In another embodiment, if the fuel is charged, the pressure regulating valve opens the evaporation path without performing the relief function. Then, the fuel vapor inside the fuel tank is fed into the canister, and accordingly, the pressure inside the tank is decreased. Under this condition, if the volume of the tank is expanded due to the resilient deformation of the resiliently deformable wall portion of the fuel tank, the evaporation path is opened. Then, the volume of the tank is reduced with the resilient restoration of the resiliently deformable wall portion of the fuel tank to the original state. Accordingly, it is possible to prevent or inhibit the fuel vapor from being ejected into atmosphere when a fuel filling port is opened.

In a further embodiment, the pressure regulating valve is disposed on the wall portion of the fuel tank. Therefore, potential damage to the evaporation path that may be caused by the relative displacement between the fuel tank and the pressure regulating valve may be prevented or inhibited. Such relative displacement may be caused, for example, due to removal of a hose and mutual friction of the connected portions when the hose is used for the evaporation path.

Another aspect according to the present invention includes fuel tank systems for supplying fuel to engines. The fuel tank systems include a fuel tank, a canister, a communication path and a control device. The fuel tank defines an internal space for storing the fuel. The internal space has a volume variable in response to a pressure within the internal space. The canister can adsorb a fuel vapor produced within the fuel tank. The communication path is constructed to introduce the fuel vapor from the fuel tank to the canister. The control device is disposed within the communication path and operable to open and close the communication path.

In one embodiment, the control device is operable in a first mode, in which the communication path is opened and closed in response to the pressure within the internal space of the fuel tank. In another embodiment, the control valve is operable in a second mode, in which the communication path is opened and closed depending on a factor different from the pressure within the internal space of the fuel tank.

DETAILED DESCRIPTION OF THE INVENTION

Figure 1:
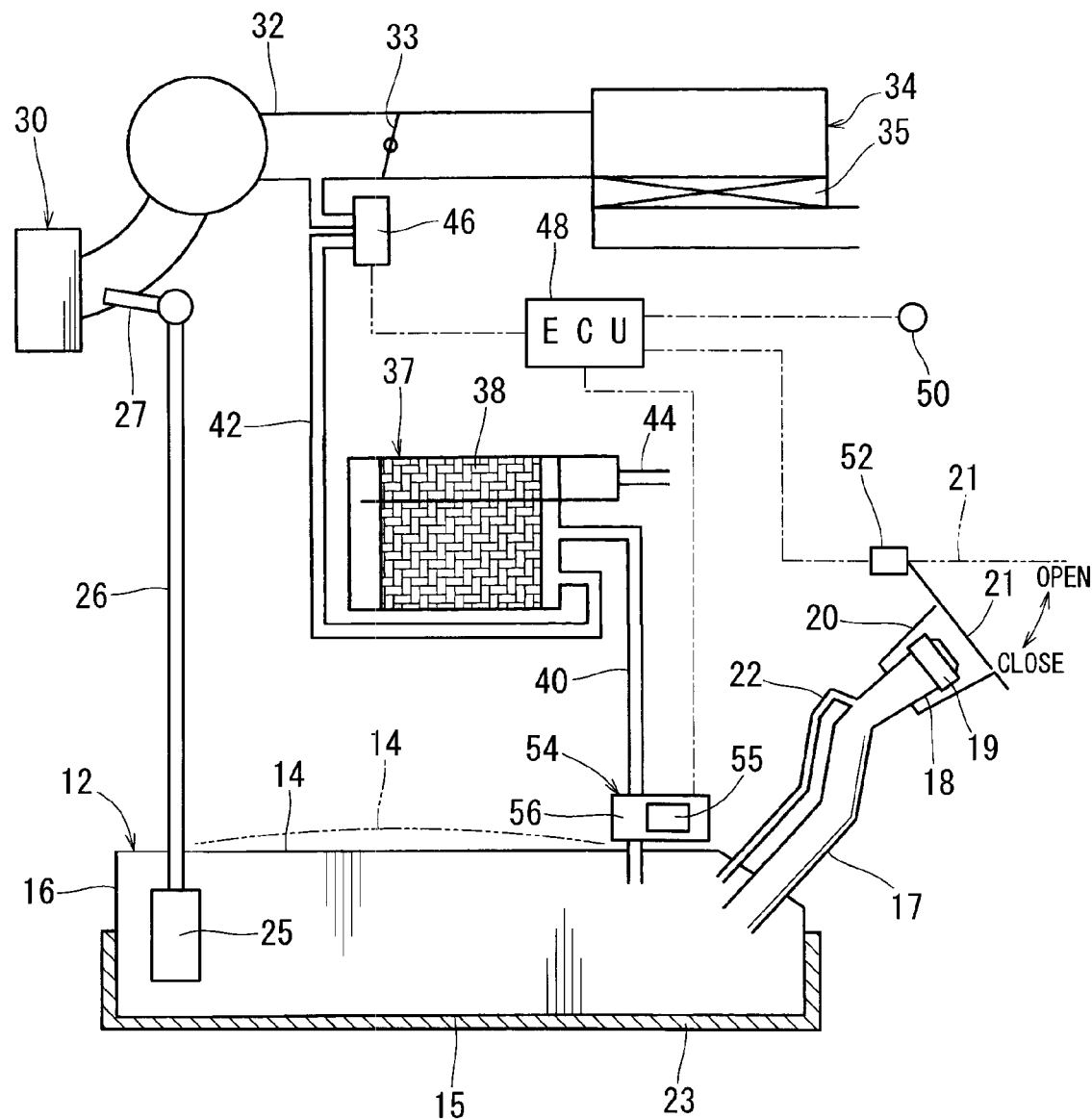
FIG. 1 is the structural view showing a fuel vapor control device according to an embodiment of the present invention.

Each of the additional features and teachings disclosed above and below may be utilized separately or in conjunction with other features and teachings to provide improved fuel vapor control devices and improved fuel tank systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Embodiment 1

A first embodiment of the present invention will be explained below. This embodiment relates to a fuel vapor control device for a vehicle. FIG. 1 is a structural view showing the fuel vapor control device. As shown in FIG. 1, a fuel tank 12 for storing fuel (specifically, liquid fuel) has a hollow configuration and is installed on a vehicle, such as an automobile (not shown). The fuel tank 12 is, for instance, made of resin and has an upper wall portion 14, a bottom wall portion 15 and a peripheral wall portion 16. The upper wall portion 14, the bottom wall portion 15 and the peripheral wall portion 16 constitute "wall portions of the tank."

The upper wall portion 14 of the fuel tank 12 can resiliently or flexurally deform, so that the upper wall portion 14 can expand upwardly in a curved manner by pressure inside the tank (see, two-dot chain line 14 in FIG. 1). Because of the resilient deformation of the upper wall portion 14, the volume of the tank 12 may be variable, in other words, the internal volume of the tank 12 may be increased and decreased. The upper wall portion 14 constitutes a "resiliently deformable wall portion." In this embodiment, the resiliently deformable wall portion is constituted by the entire part of the upper wall portion 14. However, the resiliently deformable wall portion may be constituted by a part of the upper wall portion 14. Moreover, other than the upper wall portion 14, the entire or a part(s) of the peripheral wall portion 16 and/or the bottom wall portion 15 may be formed as the resiliently deformable wall portion(s). The resiliently deformable wall portion may be easily formed by reducing thickness of the wall portion(s).

A fuel inlet pipe 17 having a fuel filling port 18 is disposed on the upper part of the fuel tank 12. The fuel inlet pipe 17 is a pipe for introducing the fuel from the fuel filling port 18 into the fuel tank 12. The fuel filling port 18 opens obliquely upward. A cap 19 is removably mounted to the fuel filling port 18. The fuel filling port 18 is disposed inside a fuel inlet box 20 placed within a vehicle body of the vehicle (not shown). The fuel inlet box 20 may be opened or closed by pivoting a fuel lid 21. The upper portion of the fuel inlet pipe 17 and the fuel tank 12 are communicated with each other via a breather path 22.

Among the wall portions of the fuel tank 12, the lower half portion of the peripheral wall portion 16 and the bottom wall portion 15 are covered with a heat insulating material 23 having a heat insulating property. The area of the wall portions of the tank 12 to be covered by the heat insulating material 23 may be appropriately enlarged or narrowed.

The fuel stored inside the fuel tank 12 can be pumped by a pump 25 disposed inside the fuel tank 12, and can be introduced to a fuel injection valve 27 (so called, an injector) via a fuel supply pipe 26. Then, the fuel is injected by the fuel injection valve 27 into an intake air channel 32 of an internal combustion engine 30. The numerical numbers 33, 34 and 35 in FIG. 1 respectively designate a throttle valve for opening and closing the intake air channel 32, an air cleaner disposed on an air introduction end of the intake air channel 32, and an air cleaner element of the air cleaner 34.

A canister 37 is mounted to the vehicle (not shown) for adsorbing fuel vapor produced within the fuel tank 12. An adsorption material 38 made of activated carbon, etc. for adsorbing and desorbing the fuel vapor is contained within the canister 37. The fuel tank 12 and the canister 37 are communicated with each other via an evaporation path 40. Accordingly, the fuel vapor produced within the fuel tank 12 can be introduced into the canister 37 via the evaporation path 40. The canister 37 and a part on the downstream side of the throttle valve 33 of the intake air channel 32 are communicated with each other via a purge path 42. Therefore, purge gas in the canister 37 containing the fuel vapor and air, can be introduced into the path on the downstream side of the throttle valve 33 via the purge path 42 by the intake air negative pressure in the intake air channel 32. The canister 37 includes an atmosphere path 44 for introducing air. The atmosphere path 44 can introduce atmospheric air and can discharge the air from the canister 37 into the atmosphere.

A purge control valve 46 is disposed in the purge path 42 and may be an electromagnetic valve. The purge control valve 46 can open and closes in order to control the amount of the purge gas flowing inside the purge path 42. The purge control valve 46 is controlled by an electronic control unit 48 (so called, ECU) installed on the vehicle. The electronic control unit 48 receives detected signals from a rotational speed sensor 50 for detecting rotational speed of the internal combustion engine 30, a lid opening and closing sensor for detecting opening and closing conditions of the fuel lid 21, and other sensors. During the operation of the internal combustion engine 30, the electronic control unit 48 controls the purge control valve 46 for introducing an appropriate amount of the purge gas into the intake air channel 32 utilizing the intake air negative pressure.

A pressure regulating valve 54 is disposed in the evaporation path 40. The pressure regulating valve 54 is disposed on the upper wall portion 14 (specifically, on the outer peripheral portion of the upper wall portion 14) of the fuel tank 12. The pressure regulating valve 54 has a relief valve 55 having a relief function and a control valve 56 configured as an electromagnetic valve, which are integrated with each other. The control valve 56 is controlled by the electronic control unit 48 for opening and closing the evaporation path 40. In this embodiment, the control valve 56 is opened if the electronic control unit 48 determines that the internal combustion engine 30 is operating, and the fuel lid 21 is being opened. On the condition other than this, the control valve 56 is closed. The electronic control unit 48 determines the operation or non-operation of the internal combustion engine 30 based on the detected signals received from the rotational speed sensor 50. Further, the electronic control unit 48 determines the opening and closing conditions of the fuel lid 21 based on the detected signals received from the lid opening and closing sensor 52.

When the control valve 56 is closed, a valve element (not shown) of the control valve 56 closes the evaporation path 40 with a biasing force of a built-in spring. When the internal pressure of the evaporation path 40 on the fuel tank side (so called "tank internal pressure") has become less than the internal pressure of the evaporation path 40 on the canister side (so called "canister internal pressure") by a set value, the valve element opens against the biasing force of the built-in spring due to the pressure difference.

The relief valve 55 is disposed in a bypass path for bypassing the control valve 56 and constituted with a diaphragm valve (not shown) for opening and closing the bypass path.

The relief valve 55 closes if the pressure difference between the tank internal pressure and the canister internal pressure has become less than the set value. The relief valve 55 opens when the pressure difference has become equal to or higher than the set value due to the pressure difference between the tank internal pressure and the canister internal pressure. The set value for opening the relief valve 55 corresponds to the tank internal pressure when the volume of the fuel tank 12 is expanded to a set volume (see, two-dot chain line 14 in FIG. 1) which is equivalent to a pressure value after subtraction of a set safety value from a maximum pressure value for the resilient deformation limit of the fuel tank 12 (the pressure that may cause permanent deformation of the tank 12).

The operations of the fuel vapor control device will be hereinafter explained. Specifically, explanations will be provided for the operations of the fuel vapor control device when the internal combustion engine 30 is operating, when the internal combustion engine 30 is not operating, and when the fuel is charged.

<Operations when the Internal Combustion Engine is Operating>

The electronic control unit 48 determines whether the internal combustion engine 30 is operating or not based on the signals detected by the rotational speed sensor 50. If the internal combustion engine 30 is operating, the electronic control unit 48 outputs a control signal to open the control valve 56 of the pressure regulating valve 54 and accordingly, without performing the relief function of the relief valve 55, the evaporation path 40 is opened. Therefore, the fuel vapor produced in the fuel tank 12 enters into the canister 37 via the evaporation path 40. Then, the fuel vapor is adsorbed by the adsorption material 38 within the canister 37. Under this condition, if the purge control valve 46 is opened by the control signal from the electronic control unit 48, air is introduced into the canister 37 via the atmosphere path 44 by the action of the negative pressure generated in the downstream side of the throttle valve 33 in the intake air channel 32. Together with the air, the fuel vapor inside the canister 37 is fed as a purge gas into the intake air path 32 via the purge path 42 due to the intake negative pressure, and is then burned in a combustion chamber of the internal combustion engine 30. The purge control valve 46 is controlled by the electronic control unit 48 and accordingly, the amount of the purge gas flowing inside the purge path 42 can be regulated to be an appropriate amount. If the internal combustion engine 30 is operating, the control valve 56 of the pressure regulating valve 54 is opened, and thus, there is almost no pressure difference between the tank internal pressure and the canister internal pressure. Therefore, the relief valve 55 is closed.

<Operations when the Internal Combustion Engine is Not Operating>

The electronic control unit 48 determines the operation or the non-operation of the internal combustion engine 30 based on the detected signals received from the rotational speed sensor 50. If the internal combustion engine 30 stops (for example, when a vehicle is parked), the electronic control unit 48 outputs a control signal to close the control valve 56 of the pressure regulating valve 54. Immediately after the internal combustion engine 30 has stopped, i.e. the vehicle has just stopped for parking, there is almost no pressure difference between the tank internal pressure and the canister internal pressure in the bypass path of the pressure regulating valve 54, and therefore, the relief valve 55 remains closed. Therefore, if the vehicle stops for parking, the relief valve 55 of the pressure regulating valve 54 starts to perform the relief function on the condition that the tank internal pressure of the fuel tank 12 is low.

Under this condition, if the volume of the fuel tank 12 is expanded to the set volume due to increase of outside air temperature, etc. and if the tank internal pressure (more specifically, the difference between the tank internal pressure and the canister internal pressure) is less than the set value, the pressure regulating valve 54 (including the relief valve 55 and the control valve 56) closes the evaporation path 40. Under this condition, until the volume of the fuel tank 12 expands to the set volume, change of the tank internal pressure due to the increase and decrease of the amount of the fuel vapor inside the tank 12 is adsorbed by the resilient deformation of the upper wall portion 14 of the fuel tank 12. Accordingly, the amount of the fuel vapor fed into the canister 37 may be reduced.

When the tank internal pressure (specifically, the difference between the tank internal pressure and the canister internal pressure) has become equal to or higher than the set value, the relief valve 55 of the pressure regulating valve 54 opens. Accordingly, the evaporation path 40 is opened and the pressure is released via the evaporation path 40 to the canister 37. In this way, excessive increase of the tank internal pressure may be prevented. Further, when the pressure inside the tank becomes less than the set value, the relief valve 55 of the pressure regulating valve 54 opens.

When the internal combustion engine 30 has stopped (i.e. the vehicle has parked), and the different between the tank internal pressure and the canister internal pressure has become less than the set value due to decrease of outside temperature etc., the valve element of the control valve 56 of the pressure regulating valve 54 opens against the biasing force of the built-in spring. Accordingly, the purge gas flows from the canister side to the fuel tank side. In this way, the excessive constriction of the fuel tank 12 due to the decrease of pressure inside the tank 12 may be inhibited or reduced.

<Operations when the Fuel is Charged>

When the fuel lid 21 is opened for charging the fuel (see, two-dot chain line 21 in FIG. 1), the electronic control unit 48 determines that the fuel lid 21 is open based on the signals received from the lid opening and closing sensor 52. Then, the electronic control unit 48 outputs a control signal to open the control valve 56 of the pressure regulating valve 54, and therefore, without performing the relief function of the relief valve 55, the evaporation path 40 is opened. Accordingly, the fuel vapor in the fuel tank 12 is fed into the canister 37 and the tank internal pressure is decreased. Under this condition, if the tank volume has been increased due to the resilient deformation of the upper wall portion 14 of the fuel tank 12 (see, two-dot chain line 14 in FIG. 1), the evaporation path 40 is opened, and therefore, the upper wall portion 14 of the fuel tank 12 resiliently restores the original state, so that the volume of the tank is decreased. In this way, the amount of discharge of the fuel vapor into the atmosphere may be reduced or no fuel vapor may be discharged into the atmosphere if the fuel filling port 18 is opened. The determination of the electronic control unit 48 is not necessarily to be based on the lid opening and closing sensor 52. More specifically, because the cap 19 may be removed, the electronic control unit 48 may determine whether the fuel is being charged based on the output signals from a sensor detecting removal of the cap 19. Further, in the vehicle having the fuel lid 21 which may only be opened and closed electrically with operation of a switch located within a vehicle cabin, the electronic control unit 48 may determine whether fuel is being charged or not based on the output signals received from this switch.

According to the above described fuel vapor control device, as the volume of the fuel tank 12 is expanded to the set volume, the pressure regulating valve 54 can be controlled to open or closes the evaporation path 40 based on the tank internal pressure. More specifically, if the tank internal pressure is less than the set value, the regulating valve 54 (the relief valve 55 and the control valve 56) closes the evaporation path 40. Under this condition, until the volume of the fuel tank 12 is expanded to the set volume, the change in the amount of the fuel vapor in the fuel tank 12 may be absorbed by the resilient deformation of the upper wall portion 14 of the fuel tank 12. Accordingly, it is possible to reduce the amount of the fuel vapor that is fed into the canister 37. Accordingly, the variable volume container and the communicating path connected to the variable volume container required for the conventional device (see, Japanese Laid-Open Patent Publication No. 11-34675) may be omitted and thus, the construction of the device may be simplified. Furthermore, cost for the fuel vapor control device may be reduced and the fuel vapor control device may be easily installed on the vehicle. If the tank internal pressure of the fuel tank 12 is equal to or higher than the set value, the relief valve 55 of the pressure regulating valve 54 opens, and therefore, the pressure is released via the evaporation path 40 into the canister 37. Further, when the tank internal pressure has become less than the set value, the relief valve 55 of the pressure regulating valve 54 closes the evaporation path 40.

When the internal combustion engine 30 is operating, the control valve 56 of the pressure regulating valve 54 opens the evaporation path 40 without performing the relief function of the relief valve 55 and thus, the tank internal pressure of the fuel tank 12 is maintained to be low. Under this condition, if the internal combustion engine 30 stops, the relief function of the relief valve 55 of the pressure regulating valve 54 starts to be performed on the condition that the tank internal pressure is low. Due to this, compared to the starting of the relief function of the relief valve 55 of the pressure regulating valve 54 on the condition that the tank internal pressure is high, the amount of the fuel vapor to be stored in the tank 12 can be increased when the internal combustion engine is stopped. In this way, the amount of the fuel vapor to be fed into the canister 37 can be reduced.

When the fuel is being charged, the control valve 56 of the pressure regulating valve 54 opens the evaporation path 40 without performing the relief function of the relief valve 55 and the fuel vapor inside the fuel tank 12 is fed into the canister 37. Accordingly, the tank internal pressure is decreased. Under this condition, if the volume of the tank is increased due to the resilient deformation of the upper wall portion 14 of the fuel tank 12, the evaporation path 40 is opened and the volume of the tank is reduced with the resilient restoration of the upper wall portion 14 to the original state. In this way, when the fuel filling port 18 is being opened, the fuel vapor may be prevented from being discharged into the atmosphere or the amount of discharge of the fuel vapor into the atmosphere can be minimized.

The pressure regulating valve 54 is disposed on the upper wall portion 14 of the fuel tank 12. Therefore, potential damage to the evaporation path 40 that may be caused by the relative displacement between the fuel tank 12 and the pressure regulating valve 54 may be prevented or minimized. Such relative displacement may be caused, for example, due to removal of a hose or mutual friction of the connected portions if the hose is used for connecting between the fuel tank 12 and the pressure regulating valve 54.

The wall portions of the fuel tank 12 are covered with the heat insulating material 23 and thus, heat conductivity between inside and outside of the fuel tank 12 may be reduced. Accordingly, the variation in amount of the fuel vapor in the fuel tank 12 may be inhibited and the change of the tank internal pressure may be reduced. In this way, the amount of discharge of fuel vapor in the fuel tank 12 to the atmosphere may be inhibited, and thus, potential air pollution due to the discharge of the fuel vapor into the atmosphere may be far effectively prevented.

The present invention is not limited to the embodiments discussed above and may be modified without departing from the scope of the present invention. For instance, the constitution of the regulating valve 54 is not limited to the constitution described in the embodiment and may be appropriately modified. Specifically, the relief valve 55 and the control valve 56 of the regulating valve 54 may be separately provided. In such a case, an evaporation path to be opened and closed by the relief valve 55 and an evaporation path to be opened and closed by the regulating valve 56 may be individually provided. Further, a pressure sensor for detecting the tank internal pressure may be provided. In such a case, the electronic control unit 48 may determine whether or not the tank internal pressure is equal to or higher than the set value based on the detected signals received from the pressure sensor. If the electronic control unit 48 determines that the tank internal pressure is equal to or higher than the set value, the electronic control unit 48 outputs a control signal to open the control valve 56. Therefore, with this arrangement, it is possible to omit the relief valve 55. Further, in the above embodiment, the electronic control unit 48 determines whether the internal combustion engine 30 is operating or not based on the detected signals received from the rotational speed sensor 50. However, the electronic control unit 48 may also determine the operation of the internal combustion engine 30 based on the on-off signals from an ignition switch. The heat insulating material 23 of the fuel tank 12 may be omitted. The regulating valve 54 may be disposed anywhere in the evaporation path 40 and may also be placed anywhere of the fuel tank 12 other than the wall portions of the fuel tank 12.

This invention claims:

1. A fuel vapor control device comprising:
   a fuel tank for storing fuel;
   a canister for adsorbing fuel vapor produced in the fuel tank;
   an evaporation path communicating between the fuel tank and the canister;
   wherein the fuel tank has a resiliently deformable wall portion that can resiliently deform in response to an amount of the fuel vapor in the fuel tank, so that volume of the fuel tank can be varied; and
   a pressure regulating valve that can perform a relief function for opening the evaporation path during the expansion of the volume of the fuel tank to a set volume;
   wherein the pressure regulating valve closes the evaporation path if the pressure inside the tank is lower than a first set value;
   wherein the pressure regulating valve opens the evaporation path if the pressure inside the fuel tank is equal to or higher than the first set value; and
   wherein the pressure regulating valve opens when the pressure inside the fuel tank becomes less than the pressure inside the canister by a second set value.

2. The fuel vapor control device as defined in claim 1, wherein the pressure regulating valve opens the evaporation path without performing the relief function when an internal combustion engine is operating.

3. The fuel vapor control device as defined in claim 1, wherein the pressure regulating valve opens the evaporation path without performing the relief function when the fuel is being charged.

4. The fuel vapor control device as defined in claim 1, wherein the pressure regulating valve is disposed on a wall portion of the fuel tank.

5. A fuel tank system for supplying fuel to an engine, comprising:
   a fuel tank defining an internal space for storing the fuel, wherein the internal space has a volume variable in response to a pressure within the internal space;
   a canister constructed to adsorb a fuel vapor produced within the fuel tank;

a communication path constructed to introduce the fuel vapor from the fuel tank to the canister; and a control device disposed within the communication path and operable to open and close the communication path;

wherein the control device is operable in a first mode, in which the communication path is opened and closed in response to the pressure within the internal space of the fuel tank; and wherein, in the first mode, the control device closes the communication path when the pressure within the fuel tank is less than a first set value, and the control valve opens the communication path when the pressure within the fuel tank is equal to or more than the first set value, and the pressure regulating valve opens when the pressure inside the fuel tank becomes less than the pressure inside the canister by a second set value.

6. The fuel tank system as in claim 5, wherein the control valve is operable in a second mode, in which the communication path is opened and closed depending on a factor different from the pressure within the internal space of the fuel tank.

7. The fuel tank system as in claim 6, wherein the factor comprises an engine condition, and the communication path is closed when the engine is not operated, and the communication path is opened when the engine is operated.

8. The fuel tank system as in claim 6, wherein the factor comprises a charging condition of the fuel into the fuel tank, and the communication path is closed when the fuel is not charged, and the communication path is opened when the fuel is charged.

9. The fuel tank system as in claim 5, wherein the fuel tank has a resiliently deformable wall portion, so that the internal volume of the fuel tank is changed as the wall portion resiliently deforms.

10. A fuel tank system for supplying fuel to an engine, comprising:

a fuel tank defining an internal space for storing the fuel, wherein the internal space has a volume variable in response to a pressure within the internal space;

a fuel inlet pipe connected to the fuel tank and having a fuel inlet port;

a canister constructed to adsorb a fuel vapor produced within the fuel tank;

a communication path connected to the fuel tank and constructed to introduce the fuel vapor from the fuel tank to the canister;

wherein the communication path is separated from the fuel inlet pipe; and a control device disposed within the communication path and operable to open and close the communication path.

11. The fuel tank system as in claim 10, wherein:

the control device is operable in a first mode and a second mode, in the first mode, the communication path is opened and closed in response to the pressure within the internal space of the fuel tank; and in the second mode, the communication path is opened and closed depending on a factor different from the pressure within the internal space of the fuel tank.

12. The fuel tank system as in claim 11, wherein:

the control device comprises a first valve and a second valve;

the first valve can open and close the communication path in response to the pressure within the internal space of the fuel tank; and the second valve can open and close the communication path independently of the first path.

13. The fuel tank system as in claim 12, wherein:

the control device further includes an electronic control unit connected to the second valve; and the electronic control unit can control the second valve for the operation of the control device in the second mode.

14. A fuel tank system for supplying fuel to an engine, comprising:

a fuel tank defining an internal space for storing the fuel, wherein the internal space has a volume variable in response to a pressure within the internal space;

a canister constructed to adsorb a fuel vapor produced within the fuel tank;

a communication path connected to the fuel tank and constructed to introduce the fuel vapor from the fuel tank to the canister; and a control device disposed within the communication path and operable to open and close the communication path; wherein:

the control device is operable in a first mode and a second mode, in the first mode, the communication path is opened and closed in response to the pressure within the internal space of the fuel tank;

in the second mode, the communication path is opened and closed depending on a factor different from the pressure within the internal space of the fuel tank;

the control device comprises a first valve, a second valve and an electronic control unit;

the first valve can open and close the communication path in response to the pressure within the internal space of the fuel tank;

the second valve can open and close the communication path independently of the first path; and the electronic control unit can control the second valve for the operation of the control device in the second mode.

15. The fuel tank system as in claim 14, wherein the factor different from the pressure within the internal space of the fuel tank comprises an engine condition.

16. The fuel tank system as in claim 14, wherein the factor different from the pressure within the internal space of the fuel tank comprises a charging condition of the fuel into the fuel tank.

* * * * *